United States Patent Office

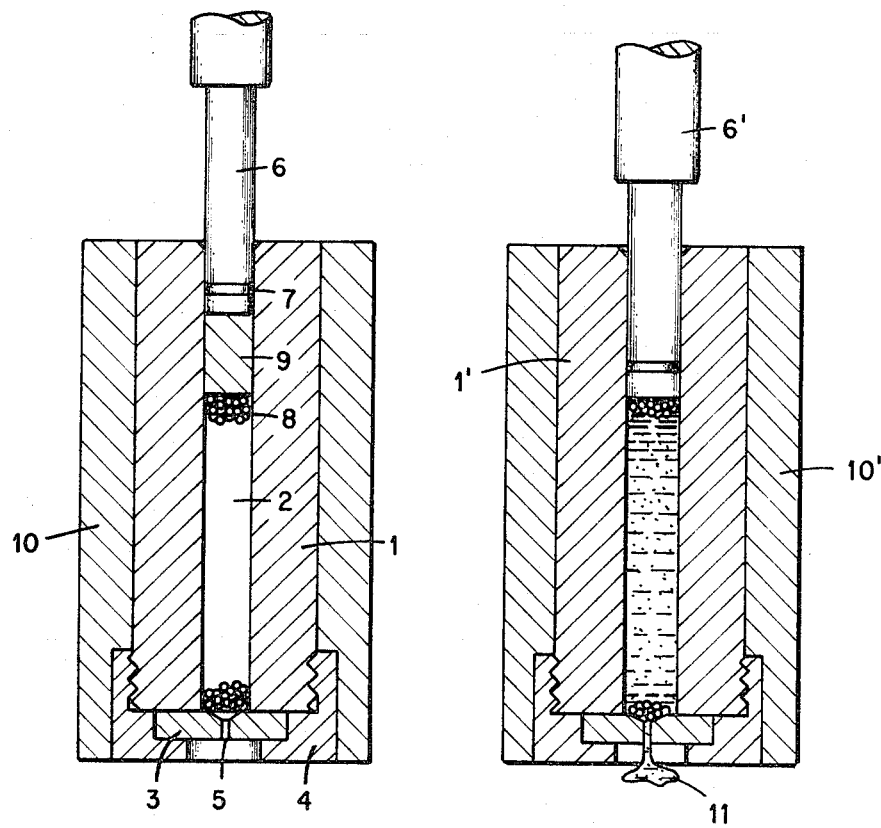

3,763,292
Patented Oct. 2, 1973

3,763,292
MANUFACTURE OF BONDED-PARTICLE NUCLEAR FUEL COMPOSITES
James G. Stradley, Oak Ridge, and John D. Sease, Knoxville, Tenn., assignors to the United States of America as represented by the United States Atomic Energy Commission
Filed Oct. 1, 1971, Ser. No. 185,641
Int. Cl. G21c 21/02
U.S. Cl. 264—.5    1 Claim

ABSTRACT OF THE DISCLOSURE

A preselected volume of nuclear fuel particles are placed in a cylindrical mold cavity followed by a solid pellet of resin-carbon matrix material of preselected volume. The mold is heated to liquefy the pellet and the liquefied matrix forced throughout the interstices of the fuel particles by advancing a piston into the mold cavity. Excess matrix is permitted to escape through a vent hole in the end of the mold opposite to that end where the pellet was originally disposed. After the matrix is resolidified by cooling, the resultant fuel composite is removed from the mold and the resin component of the matrix carbonized.

BACKGROUND OF THE INVENTION

The invention described herein relates generally to nuclear fuel elements and more particularly to the production of bonded-particle carbon-matrix nuclear fuel composites. It was made in the course of, or under, a contract with the U.S. Atomic Energy Commission.

Particulate nuclear fuels have been widely investigated for various reactor applications. Generally, these fuels comprise a central core of fissile material, surrounded by one or more layers of refractory material, such as pyrolytic carbon, silicon carbide, etc., which serve as an outer, protective, gas-impermeable coating. One such coated fuel particle, commonly referred to as a duplex-coated particle, consists of a dense actinide oxide core, a first highly porous, pyrolytic carbon coating, and an outer, gas-impermeable, protective coating of high density, isotropic, pyrolytic carbon. Another coated fuel particle described in U.S. Pat. 3,298,921 issued to Jack C. Bokros on Jan. 17, 1967, for "Pyrolytic Carbon Coated Particles for Nuclear Applications," comprised a central fuel core surrounded by a single protective coating of isotropic carbon.

Of recent interest is the incorporation or consolidation of such coated fuel particles into a carbon-containing matrix fuel composite useful, for example, in high-temperature gas-cooled reactors such as the Fort St. Vrain reactor designed by Gulf General Atomic for the Public Services Corporation of Colorado. That particular reactor has a graphite core containing approximately 210 fuel cavities per fuel element which are loaded with coated-particle carbonized-matrix fuel composites commonly referred to as fuel sticks.

A typical prior method for the fabrication of such composites or fuel sticks involves the loading of a mold with fuel particles and thereafter injecting from one end of the mold a matrix of carbonizable pitch mixture in a heated molten state to infiltrate the particle interstices. A suitable matrix composition is a coal tar pitch containing 25 to 60 weight percent graphite filler. With this mixture, a temperature of about 180° C. and a pressure of about 500 to 1500 pounds per square inch are required to achieve full penetration of a two-inch-long bed of particles. Following injection, the matrix material is permitted to cool and solidify and the resultant composite fuel stick is removed from the mold for carbonization of the pitch constituent of the matrix by heating to about 1000° C.

Injection of molten matrix into a mold filled with fuel particles has been found to have several drawbacks, however, including the existence of a cap of unfueled matrix material at one end of the resultant fuel stick due to settling and compression of the fuel particles in the constant volume mold, inhomogeneities in the matrix material due to filler settling prior to injection, and the necessity for elaborate injection equipment which is unsuitable for remote operation as is required in a hot cell fabrication operation. Hot cell or otherwise remote fabrication is required where fuel particles containing the uranium-233 isotope are being used due to the normal presence of gamma-emitting daughters of the uranium-232 isotope.

It is, accordingly, a general object of the invention to provide a method of fabricating bonded-particle carbon-matrix composite fuel sticks wherein fuel sticks of uniform composition are produced.

Another object of the invention is to provide a method of fabricating bonded-particle carbon-matrix composite fuel sticks which is suitable for remote operation as in a hot cell.

Other objects of the invention will be apparent to those skilled in the art upon examination of the following description of the preferred embodiment and appended drawings.

SUMMARY OF THE INVENTION

In accordance with the invention, a method for fabricating bonded-particle nuclear composite fuel sticks is provided wherein a solid pellet of resin-carbon matrix material is placed in a mold cavity together with a volume of nuclear fuel particles, heated to a molten state, and then forced by ram action to permeate the interstices of the fuel particles. The matrix is then permitted to resolidify by cooling, the resultant composite fuel stick removed from the mold, and the resin component of the matrix carbonized. Use of the solid pellet of matrix material is especially advantageous in that it makes the method amenable to remote operation as required where radioactive nuclear fuel particles are used. In addition, the use of a solid matrix pellet together with piston or ram insertion of the matrix into the fuel particle interstices provides a composite fuel stick product which has a more uniform composition than that obtained using hydraulic insertion techniques.

BRIEF DESCRIPTION OF THE DRAWINGS

FIG. 1 is a vertical sectional view of apparatus for fabricating fuel sticks in accordance with the invention shown loaded with fuel particles and a pellet of matrix material.

FIG. 2 shows the apparatus of FIG. 1 following impregnation of the fuel particles with matrix material.

DESCRIPTION OF THE PREFERRED EMBODIMENT

Referring now to FIG. 1, a cylindrical mold member 1, which may be fabricated from stainless steel, for example, is provided with a generally cylindrical central cavity 2 whose diameter determines the ultimate diameter of the finished composite fuel stick. The lower end of cavity 2 is essentially closed by a removable plate 3 which is secured to the mold member 1 by means of bolt 4. Plate 3 is provided with a central orifice 5 for purposes to be described in later reference to FIG. 2. An axially movable ram or piston 6 is slidably fitted within the end of cavity 2 opposite to that closed by plate 3 and is sealed to the wall of cavity 2 by a resilient gasket 7.

As shown in FIG. 1, a preselected quantity of fuel particles 8 is placed in cavity 2 of mold member 1. Such quantity may be premeasured in a separate vessel or in cavity 2 by simply adding particles until a desired depth of particles is reached in the cavity. A solid pellet 9 consisting of a preselected quantity of bonding matrix which is a solid at room temperature is placed on top of the particles and ram or piston 6 lowered against the top of the pellet. Although the matrix material may be in powder form, the pellet form is preferred since it is easier to handle and is easily preformed to contain the desired amount of matrix for a given size fuel stick.

Power is supplied to a heater 10 encompassing mold member 1 until a temperature of about 170° C. is reached in particles 8 and pellet 9. Piston 6 is then driven into bore 2 until a pressure of about 1000 p.s.i. is developed in pellet 9. This combination of temperature and pressure causes pellet 9 to melt and the molten matrix material thus formed to infiltrate through the interstices of fuel particles 8 as illustrated in FIG. 2.

As shown in FIG. 2, piston 6 is advanced into bore 2 until it contacts the top of the bed of fuel particles, thus forcing any excess matrix material 11 out through orifice 5. Mold member 1 is then removed from heater 10 and cooled, and the fuel stick removed for subsequent carbonization of the matrix material pitch component at about 1000° C.

A preferred matrix mixture for use in making pellets 9 comprises coal tar pitch (Grade 15V), Allied Chemical Company) containing 25 to 35 weight percent natural flake graphite filler (Asbury Grade 6353, Asbury Graphite, Inc.). Alternatively, from 40 to 60 weight percent Thermax (spherical carbon black, R. T. Vanderbilt Company) may be used as filler. Pellets 9 were formed using the above pitch and filler components by mixing the components in a Helicone blender at 150° C. for 20 minutes, cooling and discharging the mixture from the blender at about 120° C., cooling the mixture further with Dry Ice followed by crushing in a hammer mill to —200 mesh size powder, weighing out the crushed powder in 4-gram increments, and warm pressing the 4-gram powder increments at 70° C. in a steel mold.

Fuel sticks two inches in length and 0.492 inch in diameter have been made in accordance with the invention using apparatus substantially as shown in the drawings and pellets 9 as described above. Packing fractions of 62 to 65 volume percent were realized using coated fuel particles of about 600-micron diameter. The fuel sticks were found to have uniform compositions without the end sections of unfueled matrix material characteristic of fuel sticks made using liquid matrix injection techniques.

The above description of one embodiment of the invention is offered for illustrative purposes only and should not be interpreted in a limiting sense. For example, the simple cylindrical configuration of the mold member could be replaced with more complex shapes without departing from the scope of the invention. The particular matrix composition and fuel particles may also be varied although thermoplastic matrix material is required which is solid at room temperature and pressure. It is intended, rather, that the invention be limited only by the scope of the appended claim.

What is claimed is:
1. An improved method for making bonded-particle carbon-matrix nuclear fuel composites comprising:
 (a) placing a preselected quantity of nuclear fuel particles within an upstanding mold cavity to form a bed of fuel particles within said mold cavity;
 (b) placing a pellet of carbonaceous matrix material within said mold cavity on top of said bed of fuel particles, said pellet providing matrix material in excess of that needed to fill the fuel particle interstices in said bed of fuel particles;
 (c) inserting a piston into said mold cavity until it contacts the top surface of said pellet, said piston sealably engaging the walls of said mold cavity;
 (d) heating said pellet and fuel particles under pressure until said pellet is liquefied;
 (e) advancing said piston downwardly into said mold cavity, thereby causing said liquified matrix material to flow downward through and fill said bed of fuel particles by occupying the fuel particle interstices, said piston being advanced until it contacts the top of said bed of fuel particles with excess matrix material escaping through the bottom of said mold cavity;
 (f) cooling the fuel particles and matrix material within said mold cavity until the matrix material is solidified;
 (g) removing the fuel composite comprising said fuel particles and solidified matrix material from said mold cavity; and
 (h) thereafter carbonizing said fuel composite by heating it to about 1000° C.

References Cited
UNITED STATES PATENTS

| | | | |
|---|---|---|---|
| 2,774,108 | 12/1956 | Wyllie | 264—128 X |
| 3,558,750 | 1/1971 | Davis et al. | 264—0.5 X |
| 3,205,286 | 9/1965 | Black | 264—128 X |
| 3,021,573 | 2/1962 | Bentov | 264—128 X |
| 3,284,372 | 11/1966 | Bailey | 264—0.5 |

CARL D. QUARFORTH, Primary Examiner

R. S. GAITHER, Assistant Examiner

U.S. Cl. X.R.

264—122, 128